United States Patent
Hayashi

(10) Patent No.: US 6,927,752 B2
(45) Date of Patent: Aug. 9, 2005

(54) PLANE DISPLAY ELEMENT

(75) Inventor: Hisaaki Hayashi, Stratford Court (SG)

(73) Assignee: Kabushiki Kaisha Toshiba, Tokyo (JP)

( * ) Notice: Subject to any disclaimer, the term of this patent is extended or adjusted under 35 U.S.C. 154(b) by 310 days.

(21) Appl. No.: 10/233,527

(22) Filed: Sep. 4, 2002

(65) Prior Publication Data

US 2003/0043328 A1 Mar. 6, 2003

(30) Foreign Application Priority Data

Sep. 5, 2001 (JP) .................................. 2001-268579

(51) Int. Cl.⁷ .............................................. G09G 3/36
(52) U.S. Cl. .......................................... 345/87; 345/100
(58) Field of Search ............................ 345/55, 74–78, 345/87, 32, 84, 100, 204, 208, 212, 213; 437/51; 427/559; 257/53; 349/43, 141; 348/51; 340/870.11

(56) References Cited

U.S. PATENT DOCUMENTS

| 5,032,536 A | * | 7/1991 | Oritsuki et al. ............... 438/30 |
| 5,459,596 A | | 10/1995 | Ueda et al. |
| 5,600,461 A | | 2/1997 | Ueda et al. |
| 5,835,171 A | * | 11/1998 | Hanazawa et al. ............ 349/43 |
| 6,146,716 A | * | 11/2000 | Narang ........................ 427/559 |
| 6,195,076 B1 | * | 2/2001 | Sakuragi et al. ........... 345/74.1 |
| 6,445,406 B1 | * | 9/2002 | Taniguchi et al. ............. 348/51 |
| 2002/0005843 A1 | * | 1/2002 | Kurumisawa et al. ...... 345/204 |
| 2002/0063810 A1 | * | 5/2002 | Nakajima ..................... 349/39 |
| 2002/0067322 A1 | * | 6/2002 | Yanagawa et al. ............ 345/87 |
| 2002/0080295 A1 | * | 6/2002 | Someya et al. ............... 349/43 |
| 2002/0127857 A1 | * | 9/2002 | Ohgami et al. ............. 438/689 |
| 2002/0154086 A1 | * | 10/2002 | Furuhashi et al. .......... 345/100 |
| 2003/0160236 A1 | * | 8/2003 | Yamazaki et al. ............ 257/53 |

FOREIGN PATENT DOCUMENTS

JP     09-325367     * 12/1997

* cited by examiner

*Primary Examiner*—Amare Mengistu
*Assistant Examiner*—Prabodh Dharia
(74) *Attorney, Agent, or Firm*—Oblon, Spivak, McClelland, Maier & Neustadt, P.C.

(57) ABSTRACT

An electric field shielding wiring is provided in the gap between the pixel electrodes adjacent in parallel to the signal line, to minimize the inter-electrode parasitic capacity generated in the gap between the pixel electrodes, which is caused by the change in the pixel potential of the pixel electrode when the polarity of the signal line potential is changed, and prevent an increase in the pixel potential of the pixel electrode of the previous stage.

1 Claim, 5 Drawing Sheets

PLANE DISPLAY ELEMENT

CROSS-REFERENCE TO RELATED APPLICATIONS

This application is based upon and claims the benefit of priority from the prior Japanese Patent Application No. 2001-268579, filed Sep. 5, 2001, the entire contents of which are incorporated herein by reference.

BACKGROUND OF THE INVENTION

1. Field of the Invention

The present invention relates to a plane display element having pixel electrodes arranged like a matrix.

2. Description of the Related Art

In a plane display element comprising a plurality of switching elements such as thin film transistors (hereinafter abbreviated to TFT) provided in the proximity of an intersection of scanning line and signal line, an array substrate on which pixel electrodes are arranged like a matrix and switched by the switching element, an opposite substrate having an opposite electrode and an optical modulation layer such as liquid crystal material sealed in the gap between the array substrate and the opposite substrate, it is necessary to prevent uneven display of each pixel electrode during the manufacturing process by eliminating auxiliary capacity difference caused by deviation in alignment of pixel elements and scanning lines.

In a conventional plane display element, as shown in FIG. 6 to FIG. 8, one end portion 4a of a pixel electrode 4 rides over adjacent another scanning line 2 on an array substrate 5 which drives pixel electrodes 4 arranged like a matrix by TFT 3 put in the proximity of an intersection of signal line 1 and scanning line 2. With this structure, the area to overlap a pixel electrode 4 and a scanning line 2 is held constant regardless of whether there is alignment deviation of the pixel electrode 4 and scanning line 2 (or regardless of the degree of the deviation), and thereby the value of auxiliary capacity 50 can be held constant.

In a plane display element using such array substrate 5, to prevent image burn-in, an image is usually displayed by inverting the potential polarity of a pixel electrode to be reverse to that of the opposite electrode for each display frame. As a pattern of inverting the potential polarity of pixel electrode, it has been recommended in recent years to adopt in a plane display element a driving pattern invert the polarity of adjacent pixel electrodes along a scanning line and invert the polarity of pixel electrodes arranged along a signal line for every two pixels.

However, it has also become known that the inversion of the potential polarity for every two pixels arranged along a signal line causes uneven display appearing as a horizontal stripe in the direction along the scanning line when a half-tone raster image is displayed.

The vertical-stripe-like uneven display raises that since a parasitic capacity 51 is generated between the adjacent pixel electrodes keeping narrow space along the signal line of a plan display element, when a half-tone raster image is displayed in the driving method of inverting the potential polarity of the pixel electrodes arranged along the signal line for every two pixels, the pixel potential Vp of the previous stage is shifted by the parasitic capacity, as shown in FIG. 7.

In other words, if the potential polarity of the pixel electrodes connected to the scanning line to be scanned next is the same, the pixel potential written in the pixel electrodes connected to the scanning line of the previous stage shifts in the direction to increase the voltage impressed to a liquid crystal layer 52. Whereas, if the potential polarity of the pixel electrodes connected to the scanning line to be scanned next is different, the pixel potential written in the pixel electrodes connected to the scanning line of the previous stage shifts in the direction to decrease the voltage impressed to the liquid crystal layer 52.

As a result, the voltage from the pixel electrode to the liquid crystal material becomes different for every one scanning line, and horizontal-stripe-like uneven display occurs in the plane display element, and the display quality is debased.

BRIEF SUMMARY OF THE INVENTION

The present invention has been made to solve the above-mentioned problems in a conventional plane display element. Therefore, an object of the invention is to provide a plane display element in which the potential polarity of adjacent pixel electrodes along a scanning line is reversed, the pixel polarity is inverted so that the potential polarity of pixel electrodes arranged along a signal line is inverted for every two pixels, and satisfactory display quality free from horizontal-stripe-like uneven display is ensured even when a half-tone raster image is display.

A plane display element comprising a first substrate includes a plurality of switching elements arranged in the proximity of an intersection of signal line and scanning line placed crossing each other on a base material, pixel electrodes arranged like a matrix along the signal line and scanning line and connected to the signal line via the switching element, an auxiliary capacity line made in one body with the scanning line and having via a dielectric layer the pixel electrode to create auxiliary capacity, a second substrate includes a plurality of opposite electrode arranged opposite to the first substrate with a certain gap taken therebetween, and an optical modulation layer sealed in the gap between the first substrate and the second substrate; wherein the potential polarity of the pixel electrode arranged along the signal line is different for every two pixels, and an electric field shield wiring is further provided between the pixel electrode of the previous stage line connected to the scanning line of the previous stage and the pixel electrode of the next line connected to the scanning line of the next stage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIGS. 5A to 5E are timing charts each showing the impressed voltages when a half-tone raster image is displayed by the pixel on the array substrate shown in FIGS. 1 and 2, in which FIG. 5A shows the impressed voltage when writing negative polarity into the nth scanning line, FIG. 5B shows the impressed voltage when writing positive polarity into the n+1st scanning line, FIG. 5C shows the impressed voltage when writing positive polarity into the n+2nd scanning line, FIG. 5D shows the impressed voltage when writing negative polarity into the n+3rd scanning line, and FIG. 5E shows the impressed voltage when writing negative polarity into the n+4th scanning line, respectively;

FIGS. 7A to 7E are timing charts each showing the impressed voltages when a half-tone raster image is displayed by the known liquid crystal display element shown in FIG. 6, in which FIG. 7A shows the impressed voltage when writing negative polarity into the nth scanning line, FIG. 7B shows the impressed voltage when writing positive polarity into the n+1st scanning line, FIG. 7C shows the impressed voltage when writing positive polarity into the n+2nd scanning line, FIG. 7D shows the impressed voltage when writing negative polarity into the n+3rd scanning line, and FIG. 7E shows the impressed voltage when writing negative polarity into the n+4th scanning line, respectively.

DETAILED DESCRIPTION OF THE INVENTION

Hereinafter, preferred embodiments of the present invention will be explained with reference to Figures.

Figure 1:
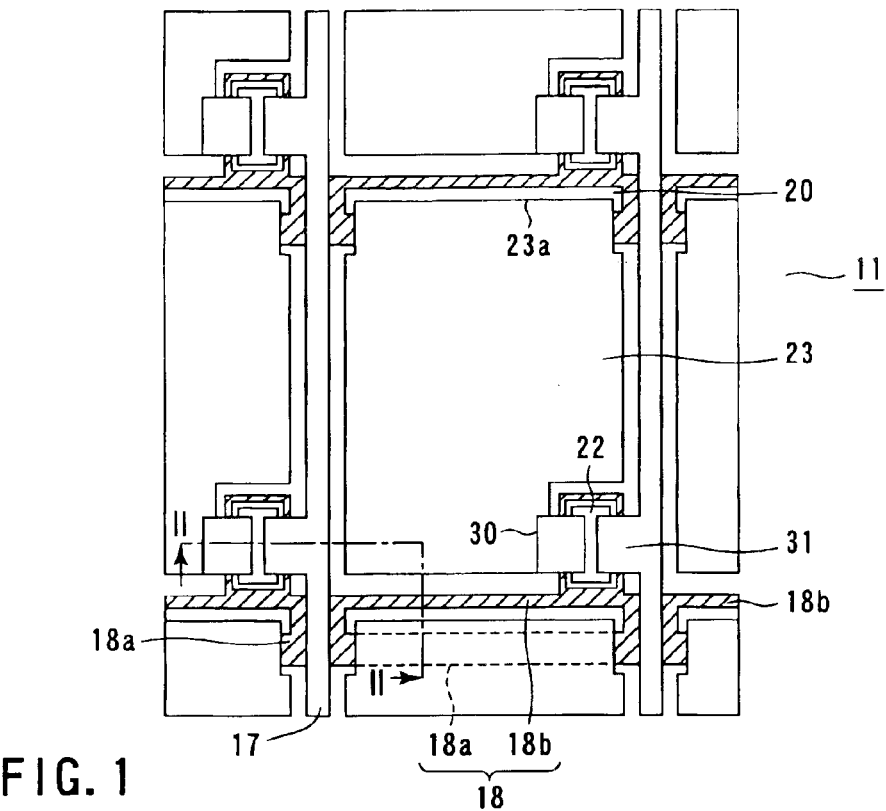
FIG. 1 is a schematic plane view showing a part of an array substrate applied to an embodiment of the present invention.

As shown in FIG. 1, an active matrix type liquid crystal display element 10 has such structure that an array substrate 11, or a first substrate, and an opposite substrate 12, or a second substrate, are arranged opposite to each other with an arbitrary gap held therebetween by a spacer (not shown), and a liquid crystal layer 14, or an optical modulation layer, is sealed in the gap between these two substrates.

The array substrate 11 is arranged so that 1024×3 signal lines and 768 scanning lines intersect at substantially right angle on a glass plate 16. The scanning lines are separated into auxiliary capacity lines 18a indicated by a dotted line in FIG. 2 and electric field shielding wiring 18b indicated by a solid line in FIG. 2 through a slit 20, and directly disposed on the glass substrate 16.

A gate insulating film 21 formed by silicon dioxide ($SiO_2$) is arranged on the glass substrate 16 just like covering the scanning lines 18. Signal lines 17 are arranged on the gate insulating film 21. A TFT (Thin Film Transistor) 22, or a switching element, is arranged in the proximity of the intersection of signal lines 17 and scanning lines 18.

Each of the TFT 22 includes a semiconductor layer 26 with an amorphous silicon (hereinafter abbreviated to a-Si) pattern formed on a gate electrode 24, made in one body with the scanning lines 18, through the gate insulating film 21, a channel protection layer 27 to protect the channel area of the semiconductor layer 26, and a source electrode 30 and a drain electrode 31 provided through an ohmic contact layer 28 formed by the $n^+$ type amorphous silicon ($n^+$a-Si).

A pixel electrode 23 formed by indium tin oxide (hereinafter, abbreviated to ITO) and shaped in a predetermined pattern is connected to the source electrode 30 (formed in one body with the signal lines 17) through an inter-layer insulating film 32.

Figure 2:
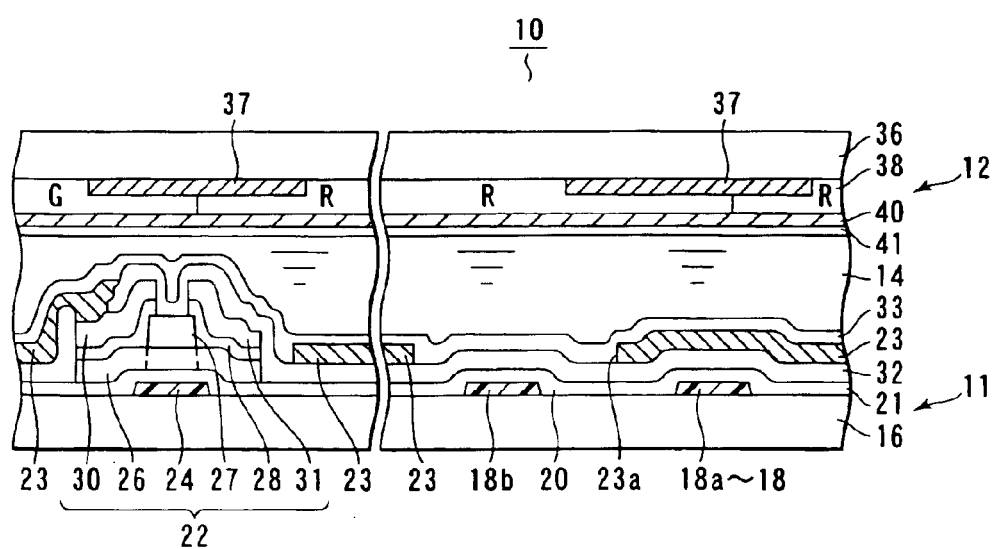
FIG. 2 is a schematic sectional view of the array substrate of FIG. 1 taken along the lines II to II of FIG. 1.

An upper end 23a of the pixel electrode 23 shown in FIG. 2 is extended to an area proximity of the slit 20 riding over the auxiliary capacity line 18a of the scanning line 18 of the pixel electrode 23 of the previous stage. The pixel electrode 23 forms auxiliary capacity (Cs) in the area overlapping with the auxiliary capacity line 18a.

Light shielding films 37 are provided on the glass substrate 36 of the opposite substrate 12. The light shielding films 37 are formed by a chrome layer to shield the gap between the TFT 22 of the array substrate 11, pixel electrode 23 and the signal line 17 and the gap between the pixel electrode 23 and the scanning line 18 when the crystal display element 10 is completed.

A color filter layer 38, which is a resin layer colored to three primary colors red (R), green (G) and blue (B), is disposed between the light shielding films 37 to realize color display. The color filter layer 38 is disposed just like filling the clearance between the light shielding films 37. An opposite electrode 40 formed by ITO is stacked on the color filter layer 38.

On the opposing sides of the array substrate 11 and opposite substrate 12, orientation films 33 and 41 formed by polyamide are coated by the screen printing method, and then treated by rubbing. The both substrates 11 and 12 are constructed so that the orienting direction of each orientation film 33, 34 becomes approximately 90°. The space between the substrates is set to constant by a spacer (not shown). A liquid crystal cell is formed in this way. Then, as explained before, a liquid crystal element (liquid crystal material) is injected into that space to make up the liquid crystal layer 14.

A polarizing plate (not shown) is stuck to the surfaces of the substrates 11 and 12 of the liquid crystal cell containing the liquid crystal layer 14, thereby completing the liquid crystal display element 10.

Figures 3, 4:
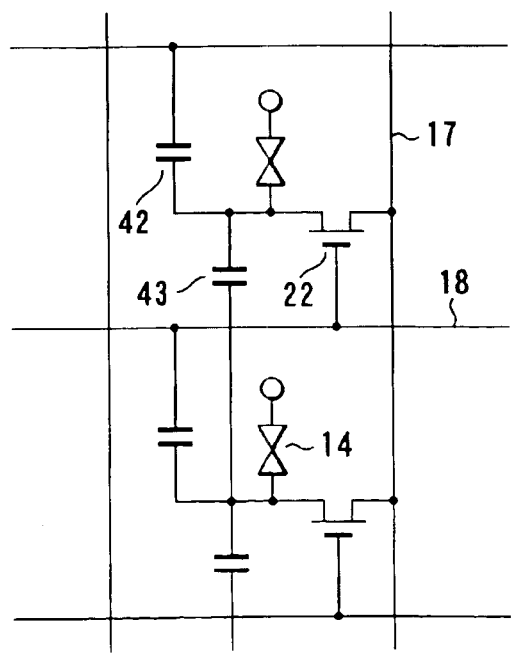
FIG. 3 is a schematic view showing the polarities of the video signals applied to the pixels on the array substrate shown in FIGS. 1 and 2.
FIG. 4 is a schematic circuit diagram showing the equivalent circuit of the pixel on the array substrate shown in FIGS. 1 and 2.

In the liquid crystal display element 10, the pixel potential polarity is inverted like the pattern shown in FIG. 3 according to an input video signal, and is impressed to each pixel electrode. In other words, assuming that the vertical direction of FIG. 3 to be parallel to the signal line 17 and the horizontal direction to be parallel to the scanning line 18, each pixel polarity is driven so that the potential of the pixel electrodes 23 adjacent in parallel to the scanning line 18 is inverted and the potential of the adjacent pixel electrodes 23 parallel to the signal line is 17 inverted for every two pixels.

In the liquid crystal display element 10, the electrode field shielding wiring 18b of the scanning line 18 is interposed between the vertically adjacent pixel electrodes 23, and the electric field is shielded, whereby the inter-electrode parasitic capacity (Cpp') between the vertically adjacent pixel electrodes 23 is decreased. Auxiliary capacity (Cs) 42 and inter-electrode parasitic capacity (Cpp') 43 are shown in FIG. 4. This minimizes fluctuation in the pixel potential of the upper stage which is conventionally caused by the parasitic capacity (Cpp') due to the narrow space between the vertically adjacent pixel electrodes 23.

We performed the half-tone raster display test in the liquid crystal display element 10, and obtained the potential shown in FIGS. 5A to 5E at the pixel electrode 23. Where, Vp is the pixel potential, Vg is the scanning line potential, Vsig is the signal line potential, Vcom is the opposite electrode potential, and VLc is the liquid crystal impressed voltage, respectively.

The polarity of the signal line potential Vsig changes at every 2H (H denotes horizontal scanning period). The scanning line potential Vg has a scanning pulse α to turn on the TFT 22 and a compensation pulse β to compensate the pixel potential fluctuation of the pixel electrode 23 caused by the parasitic capacity generated while the TFT 22 is off, and is sequentially impressed to the scanning line 18.

Figures 5A, 5B, 5C, 5D, 5E:
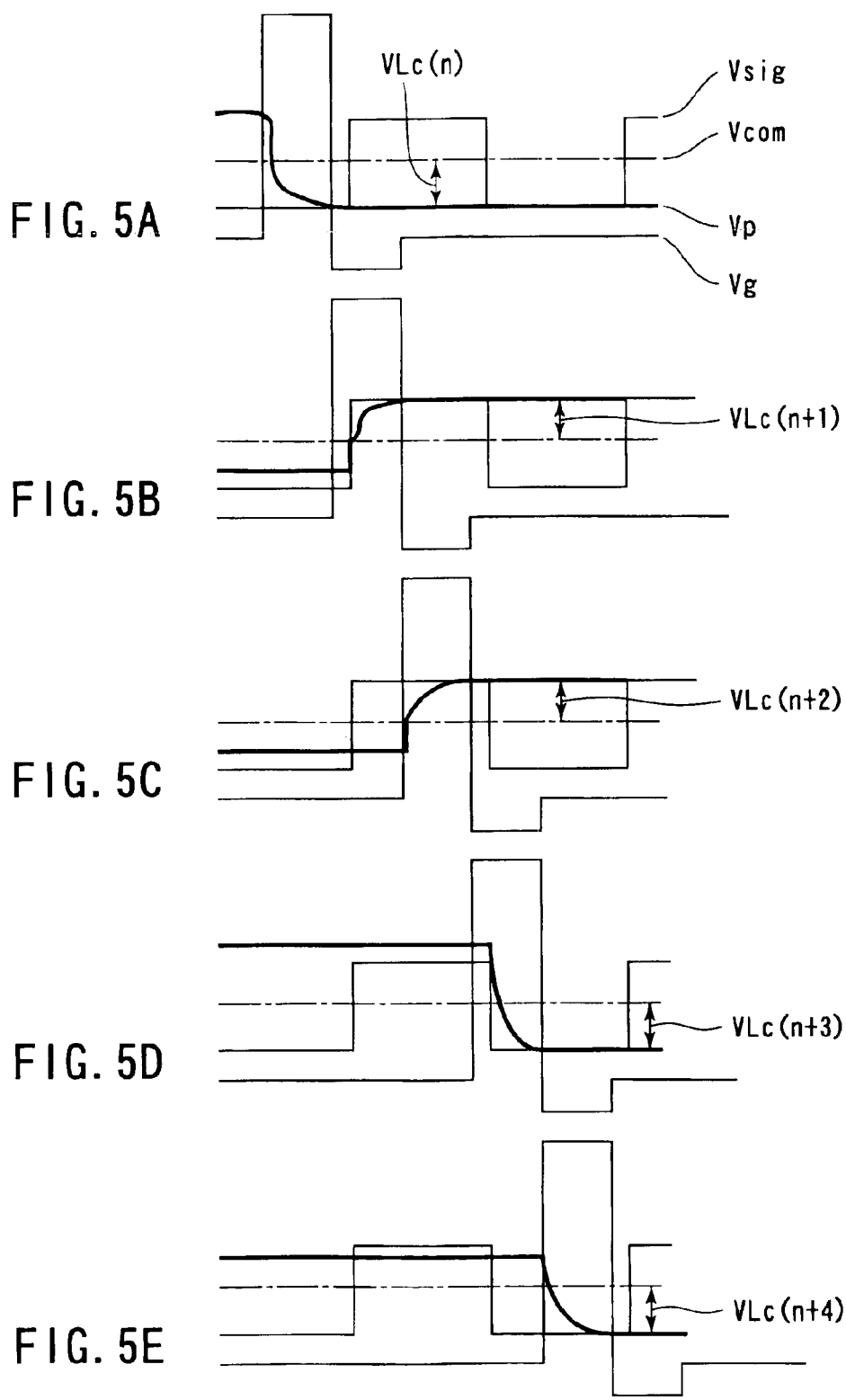
Figure 6:
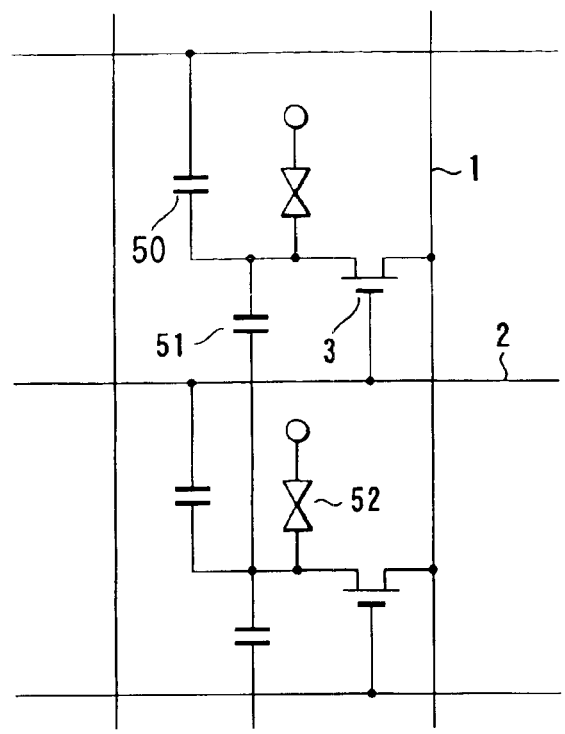
FIG. 6 is an equivalent circuit diagram of the pixel in a conventional liquid crystal display element.
Figure 8:
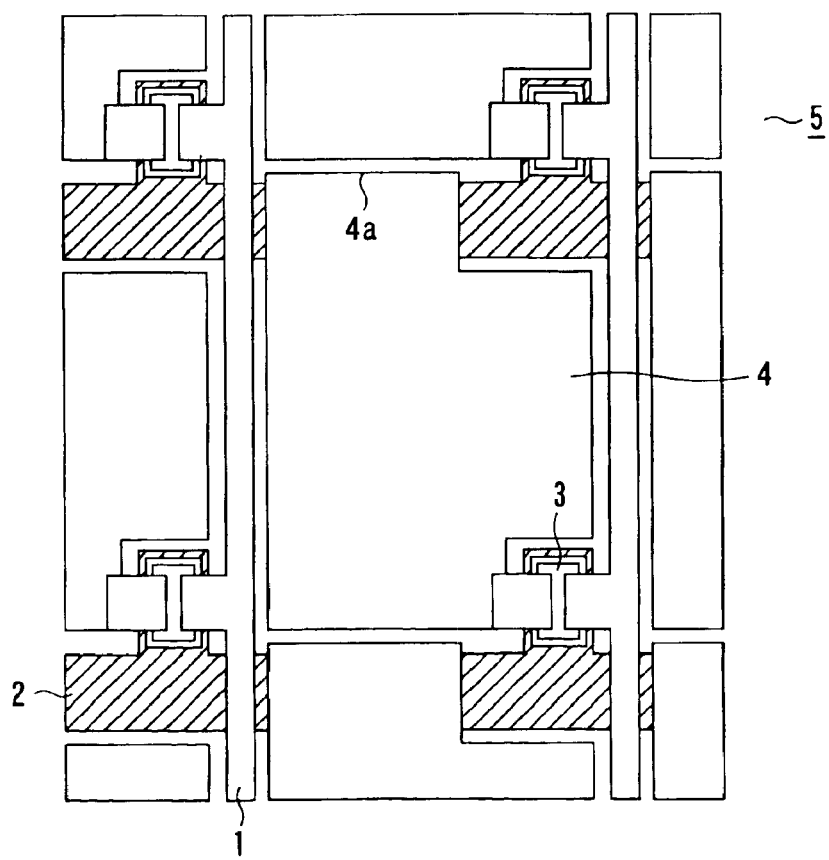
FIG. 8 is a schematic plane view showing a part of the array substrate in a conventional liquid crystal display element shown in FIG. 6.

When the liquid crystal display element 10 displays a half-tone raster image, the TFT 22 is turned on by the scanning pulse α in the nth scanning line as shown in FIG. 5A, and the pixel potential Vp of the nth pixel electrode shown in FIG. 3 writes the signal line potential Vsig (i.e., the signal line potential Vsig is written by the pixel potential Vp). In the next 1H, the signal line potential Vsig is written in the n+1st pixel electrode (FIG. 3) connected to the n+1st scanning line, or the next downward adjacent scanning line, through the TFT 22. At this time, as shown in FIG. 5B, the pixel potential Vp of the pixel electrode connected to the n+1st pixel electrode is changed from negative to positive polarity.

Figure 7A:
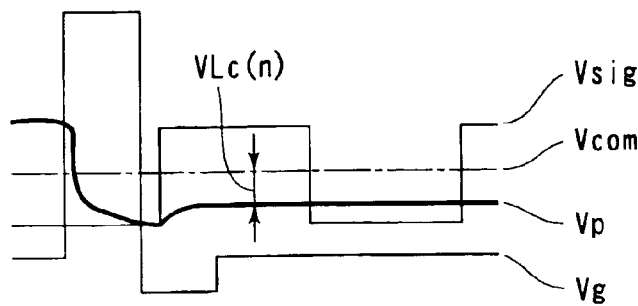

The polarity change in the pixel potential Vp changes the pixel potential Vp of the pixel electrode in the next stage through the inter-electrode parasitic capacity (Cpp'), and consequently increases the pixel potential Vp. In a conventional example, as shown in FIG. 7A, the liquid crystal impressed voltage VLc (n), which has the pixel potential Vp of the pixel electrode connected to the nth scanning line and the opposite electrode potential Vcom, becomes a little smaller than the input video signal.

However, in the liquid crystal display element 10, an electric field shielding wiring 18b is provided in the gap between the nth and n+1st pixel electrodes, and the inter-electrode parasitic capacity (Cpp') is very small. Thus, an increase in the pixel potential Vp caused by the inter-electrode parasitic capacity (Cpp') is very small. Therefore, the liquid crystal impressed voltage VLc (n), having the pixel potential Vp of the pixel electrode connected to the nth scanning line and the opposite electrode potential Vcom, becomes almost equal to the input vide signal as shown in FIG. 5A.

Figure 7B:
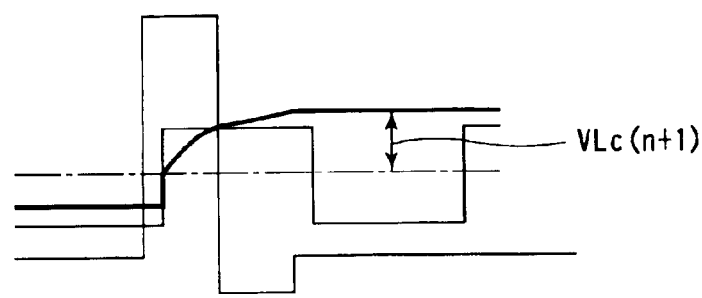

Next, the signal line potential Vsig is written in the n+2nd pixel electrode (FIG. 3) connected to the n+2nd scanning line through the TFT 22. At this time, as shown in FIG. 5C, the polarity of the pixel potential Vp of the pixel electrode connected to the n+2nd pixel electrode is unchanged from positive. Therefore, the pixel potential Vp of the pixel electrode (n+1) connected to the n+1st stage is increased a little through the inter-electrode parasitic capacity (Cpp') in a conventional example as shown in FIG. 7B, and the liquid crystal impressed voltage VLc (n) composed of the pixel potential Vp of the pixel electrode connected to the nth scanning line and the opposite electrode potential Vcom becomes a little larger than the input video signal.

However, in the liquid crystal display element 10, an electric field shielding wiring 18b is provided in the gap between the n+1st and n+2nd pixel electrodes, and the inter-electrode parasitic capacity (Cpp') is very small. Thus, an increase in the pixel potential Vp caused by the inter-electrode parasitic capacity (Cpp') is very small. Therefore, the liquid crystal impressed voltage VLc (n), which includes the pixel potential Vp of the pixel electrode connected to the n+1st scanning line and the opposite electrode potential Vcom, becomes almost equal to the input vide signal as shown in FIG. 5B.

Next, the signal line potential Vsig is written in the n+3rd pixel electrode (FIG. 3) connected to the n+3rd scanning line through the TFT 22. At this time, as shown in FIG. 5D, the polarity of the pixel potential Vp of the pixel electrode connected to the n+3rd pixel electrode is changed from positive to negative.

Figure 7C:
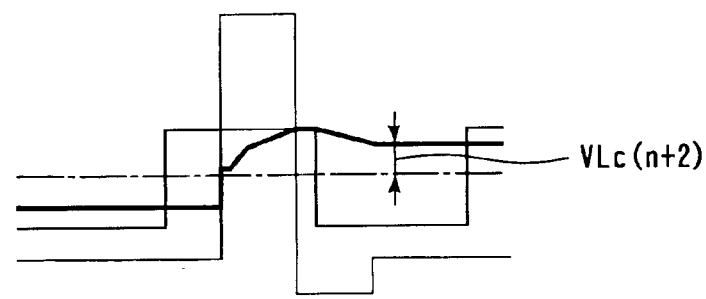

The polarity change in the pixel potential Vp changes the pixel potential Vp of the pixel electrode in the next stage through the inter-electrode parasitic capacity (Cpp'), and consequently increases the pixel potential Vp. In a conventional example, as shown in FIG. 7C, the liquid crystal impressed voltage VLc (n), consisting of the pixel potential Vp of the pixel electrode connected to the n+2nd scanning line and the opposite electrode potential Vcom, becomes smaller than the input video signal.

However, regardless of the change in the pixel potential Vp, an electric field shielding wiring 18b is provided in the gap between the n+2nd and n+3rd pixel electrodes, and the inter-electrode parasitic capacity (Cpp') is very small. Thus, an increase in the pixel potential Vp caused by the inter-electrode parasitic capacity (Cpp') is very small. Therefore, the liquid crystal impressed voltage VLc (n+2), which consists of the pixel potential Vp of the pixel electrode connected to the nth scanning line and the opposite electrode potential Vcom, becomes almost equal to the input vide signal as shown in FIG. 5C.

Figure 7D:
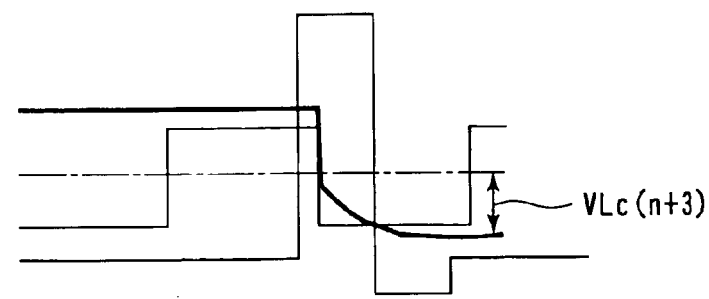
Figure 7E:
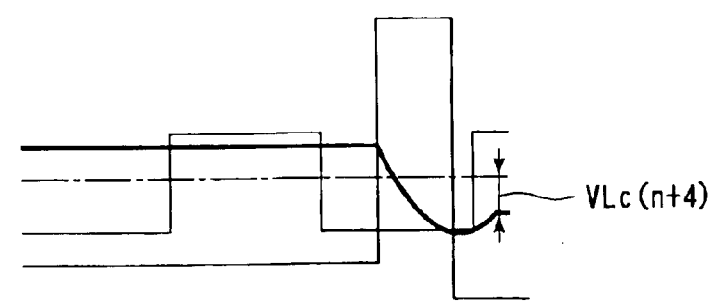

Next, the signal line potential Vsig is written in the n+4th pixel electrode (FIG. 3) connected to the n+4th scanning line through the TFT 22. At this time, as shown in FIG. 5E, the polarity of the pixel potential Vp of the pixel electrode connected to the n+4th pixel electrode is unchanged from negative. Therefore, the pixel potential Vp of the pixel electrode (n+3) connected to the n+3rd stage is increased a little through the inter-electrode parasitic capacity (Cpp') in a conventional example as shown in FIG. 7D. That is, the liquid crystal impressed voltage VLc (n+3), which includes the pixel potential Vp of the pixel electrode connected to the n+3rd scanning line and the opposite electrode potential Vcom, becomes a little larger than the input video signal.

However, in the liquid crystal display element 10 of the present invention, an electric field shielding wiring 18b is provided in the gap between the n+3rd and n+4th pixel electrodes, and the inter-electrode parasitic capacity (Cpp') is very small. Thus, an increase in the pixel potential Vp caused by the inter-electrode parasitic capacity (Cpp') is little. Therefore, the liquid crystal impressed voltage VLc (n+3), includes the pixel potential Vp of the pixel electrode connected to the n+3rd scanning line and the opposite electrode potential Vcom, becomes almost equal to the input vide signal as shown in FIG. 5D.

As for the pixel potential of the pixel electrode connected to the n+4th and following pixel electrodes, the description is the same as for the potential of nth and following pixel electrodes. The liquid crystal impressed voltage VLc, which consists of the pixel potential Vp of the pixel electrode and the opposite electrode potential Vcom, becomes almost equal to the input vide signal throughout the liquid crystal display element 10.

As a result, no horizontal-stripe-like uneven display occurs when a half-tone raster image is displayed, and the satisfactory half-tone raster display can be obtained.

As described hereinbefore, in the liquid crystal display element 10 of the present invention, the pixel electrodes 23 are electrically shielded by providing an electric field shielding wiring 18b between the pixel electrode 23n of the previous stage connected to the scanning line 18n and pixel electrode 23 (n+1) of the next line connected to the scanning line 18 (n+1) of the next stage. This can satisfactory decrease the inter-electrode parasitic capacity (Cpp') generated between the pixel electrodes 23 caused by the potential change when changing the polarity of the signal line 17, even if the space between the adjacent pixel electrodes 23 is narrow. As a result, when a half-tone raster image is displayed in the liquid crystal display element 10, horizontal-stripe-like uneven display caused by the inter-electrode parasitic capacity (Cpp') can be prevented, and a liquid crystal display element with uniform high definition display can be realized.

Fluctuation in the auxiliary capacity (Cs) can also be prevented by providing a slit 20 in the scanning line 18 and by disposing the upper end 23a of the pixel electrode 23 within the slit 20. In this case, also, uneven display of each pixel can be prevented and uniform display can be obtained.

The present invention is not to be limited by the illustrative, preferred embodiments disclosed herein. Modifications and variations will be possible without departing from the sprit and scope of the present invention. For example, the number of pixel electrodes arranged like a matrix is not limited.

The shapes of the electric field shielding wiring and auxiliary capacity line are not limited. If the positioning accuracy of the scanning line and the upper end of pixel electrode is high, it may be unnecessary to provide a slit in the scanning line.

Further, a color filter layer can be formed on the array substrate.

Still further, the present invention can also be effectively applied to organic EL elements and the like with the structure that a hole transfer layer or organic light emitting layer is formed between the pixel electrode and the opposite electrode.

As explained hereinbefore, according to the present invention, an electric field shielding wiring is provided in the narrow space between the pixel electrodes parallel to the signal line, thereby the inter-electrode parasitic capacity generated between the pixel electrodes can be extremely reduced. This minimizes the fluctuation in the voltage impressed to the optical modulation layer of the adjacent pixel electrode, which is caused by the pixel potential change. Moreover, uneven display appearing as a horizontal stripe can be prevented when a half-tone raster image is displayed. These make it possible to realize practical use of a plane display element with uniform high definition display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A plane display element comprising a first substrate including a plurality of switching elements arranged in the proximity of an intersection of signal line and scanning line placed crossing each other on a base material, pixel electrodes arranged like a matrix along said signal line and scanning line and connected to said signal line via said switching element, an auxiliary capacity line made in one body with said scanning line and having via a dielectric layer said pixel electrode to create auxiliary capacity, a second substrate includes a plurality of opposite electrode arranged opposite to said first substrate with a certain gap taken therebetween, and an optical modulation layer sealed in the gap between said first substrate and said second substrate;

wherein the potential polarity of said pixel electrode arranged along said signal line is different for every two pixels, and an electric field shield wiring is further provided between said pixel electrode of the previous stage line connected to said scanning line of the previous stage and said pixel electrode of the next line connected to said scanning line of the next stage;

wherein said scanning line includes said auxiliary capacity line and said electric field shielding wiring made in one body through a slit, and one end of said pixel electrode is disposed within a slit area of said scanning line.

* * * * *